(12) United States Patent
Harada

(10) Patent No.: US 7,274,433 B2
(45) Date of Patent: Sep. 25, 2007

(54) OBJECTIVE, OPTICAL ANALYZER, METHOD OF DRIVING OPTICAL ANALYZER, AND MICROSCOPE

(75) Inventor: Mitsuo Harada, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/482,273

(22) Filed: Jul. 7, 2006

(65) Prior Publication Data

US 2006/0262419 A1 Nov. 23, 2006

Related U.S. Application Data

(63) Continuation of application No. PCT/JP2005/000043, filed on Jan. 5, 2005.

(30) Foreign Application Priority Data

Jan. 7, 2004 (JP) ............................. 2004-002107

(51) Int. Cl.
G03B 27/42 (2006.01)
G03B 27/52 (2006.01)
G03B 27/32 (2006.01)

(52) U.S. Cl. ..................... 355/30; 355/53; 355/77; 355/63; 250/491.1

(58) Field of Classification Search ............ 250/491.1, 250/396 ML; 355/53, 30, 77, 63
See application file for complete search history.

(56) References Cited

U.S. PATENT DOCUMENTS 6,954,256 B2 * 10/2005 Flagello et al. ............... 355/53
7,088,422 B2 * 8/2006 Hakey et al. ................. 355/30
7,184,227 B2 * 2/2007 Yoshida ....................... 359/818
2004/0165778 A1 * 8/2004 Cartlidge et al. ............ 382/211
2006/0023181 A1 * 2/2006 Novak ........................... 355/53
2006/0274424 A1 * 12/2006 Okazaki et al. ............. 359/661

FOREIGN PATENT DOCUMENTS

| JP | 59-109310 | 7/1984 |
|---|---|---|
| JP | 59-147107 | 10/1984 |
| JP | 8-190053 | 7/1996 |
| JP | 10-123426 | 5/1998 |
| JP | 2000-199858 | 7/2000 |
| JP | 2003-29162 | 1/2003 |
| JP | 2003-185926 | 7/2003 |

* cited by examiner

Primary Examiner—Robert Kim
Assistant Examiner—Johnnie L Smith, II
(74) Attorney, Agent, or Firm—Scully, Scott, Murphy & Presser, P.C.

(57) ABSTRACT

An objective having an apical lens and a lens frame which supports the apical lens, includes an elastic member which supports the lens frame by exerting a bias force in a central axial direction of the apical lens, and an apex of the lens frame has a convex portion which projects outward in the central axial direction more than an apical surface of the apical lens.

17 Claims, 6 Drawing Sheets

OBJECTIVE, OPTICAL ANALYZER, METHOD OF DRIVING OPTICAL ANALYZER, AND MICROSCOPE

CROSS REFERENCE TO RELATED APPLICATIONS

This is a Continuation Application of PCT Application No. PCT/JP2005/000043, filed Jan. 5, 2005, which was published under PCT Article 21(2) in Japanese.

This application is based upon and claims the benefit of priority from prior Japanese Patent Application No. 2004-002107, filed Jan. 7, 2004, the entire contents of which are incorporated herein by reference.

BACKGROUND OF THE INVENTION

1. Field of the Invention

The present invention relates to an objective, a microscope using the same, an optical analyzer, and a method of driving the analyzer.

2. Description of the Related Art

Generally, in a microscope with upright frame, focusing is carried out onto a sample such that a distance between the sample and an objective is made to be an operating distance. At this time, when a lens surface or a lens frame of the objective contacts the sample or a cover glass, the objective or a specimen may be damaged. For this reason, an attempt is made to leave a sufficient distance between the objective and the specimen in advance in order to prevent the objective or the specimen from being damaged.

On the other hand, the same holds for an inverted microscope in which an objective is arranged under a specimen plate or a micro plate, the inverted microscope being used for an optical analyzer, and an attempt is made to leave a sufficient distance between the objective and the plate in order to prevent the objective from contacting the bottom face of the plate.

However, the surface of a sample may be highly convex or concave, or a cover glass and a plate may be inclined. In such a case, when the sample, the cover glass, and the plate are shifted in a plane perpendicular to an optical axis of the objective in order to change an observing position in a case where the objective is very close to the sample, the cover glass or the plate, the objective, the lens surface or the lens frame of the objective may collide with the sample, the cover glass, or the plate, and the sample, the cover glass, and the plate are in some cases damaged.

In particular, in a case of a micro plate for use in an optical analyzer, it is difficult to measure respective wells continuously when there is a strain in the entire micro plate, or the thickness of the bottom is uneven, or the bottom face of the micro plate is strained due to undulation being brought about in the bottom plate even if the thickness of the bottom is even. Consequently, the operation efficiency for optical analysis is greatly deteriorated.

As a countermeasure, a confocal scanning optical microscope as will be described below is disclosed as a method of preventing damage to a sample or an objective due to the lens surface or the lens frame of the objective contacting the sample, (refer to Jpn. Pat. Appln. KOKAI Publication No. 8-190053). To determine an observation range or a measurement range of a sample, a shift only to a direction along which the objective and the sample become closer is first permitted. Next, when a focal position of the objective is shifted onto the uppermost surface of the sample, this is an upper limit. Then, a control is made such that, by sequentially permitting a shift to a direction along which the focal position of the objective and the sample are contacted with or are apart from, a position where the focal position is set to the lowermost surface on the top surface of the sample can be found. When a shift amount of the objective exceeds that an operating distance, the shift is stopped.

Further, in order to protect a sample, a microscope system is disclosed in which a tactile sensor for sensing contact with a sample is provided to an objective, and a stage is shifted in a direction that the sample is kept away from the objective by a sensor signal from the tactile sensor (refer to Jpn. Pat. Appln. KOKAI Publication No. 2000-199858). Moreover, an objective for a microscope is also disclosed in which an internal cylinder for holding an apical lens of an objective is biased upward by a coil spring, and when an apex of the objective bumps into, for example, a container, a buffering action of the coil spring acts, which prevents the apical lens from being broken (refer to Jpn. Pat. Appln. KOKAI Publication No. 10-123426).

BRIEF SUMMARY OF THE INVENTION

However, in the confocal scanning optical microscope disclosed in Jpn. Pat. Appln. KOKAI Publication No. 8-190053, it is necessary to determine an observation range or a measurement range of a sample at each observation place or each measurement place of the sample, which prolongs the determining operation. In addition, in Jpn. Pat. Appln. KOKAI Publication No. 8-190053, there is no description that the objective observes or measures while in contact with a sample, a cover glass, or a plate.

Further, in the microscope system disclosed in Jpn. Pat. Appln. KOKAI Publication No. 2000-199858, it is necessary to carry out a shift of the stage or focusing every time the stage is shifted in a direction along which the sample is kept away from the objective by a sensor signal from the tactile sensor, which requires time for the operation. Also in Jpn. Pat. Appln. KOKAI Publication No. 2000-199858, there is no description that the objective observes or measures while in contact with a sample, a cover glass, or a plate.

Moreover, in the objective for a microscope disclosed in Jpn. Pat. Appln. KOKAI Publication No. 10-123426, it is necessary to carry out focusing at the time of starting observation of the sample when the apex of the objective bumps into, for example, the container, which takes time for the focusing operation. Also in Jpn. Pat. Appln. KOKAI Publication No. 10-123426, there is no description that the objective observes or measures while in contact with a sample, a cover glass, or a plate.

The present invention is to provide an objective, a microscope, an optical analyzer, and a method of driving the optical analyzer, capable of preventing damage to an measuring object, a plate which supports the measuring object, a container which houses the measuring object, or the like, including the objective.

A first aspect of the present invention is an objective which has an apical lens and a lens frame which supports the apical lens, the objective comprising an elastic member which supports the lens frame by exerting a bias force in a central axial direction of the apical lens, wherein an apex of the lens frame has a convex portion which projects outward in the central axial direction from the apical surface of the apical lens.

According to the first aspect of the present invention, when a measuring object is measured by using the objective of the invention, the elastic member presses the lens frame against a surface of a measuring object, a plate which supports the measuring object, or a container which houses the measuring object facing the objective. Consequently, even when the point of contact in the central axial direction is changed by shifting the measuring object, the plate or the container in a plane perpendicular to a central axis of the apical lens, the apex of the lens frame is always in contact with the measuring object, the plate or the container, and thus, it is possible to carry out measurement without the lens frame and the measuring object colliding. Further, because the elastic member absorbs vibration at the time of contact with the measuring object, the plate or the container with the objective, and absorbs a positional change of the point of contact in the central axial direction, vibration of the measuring object can be reduced. Furthermore, the apex of the lens frame serves as a spacer between the apical lens and the measuring object, the plate or the container to maintain a distance from the measuring object, the plate or the container to the apical lens substantially constant by having contact therewith, which prevents the apical lens from having contact with the measuring object, the plate or the container.

Moreover, a distance from the apical lens to the measuring object, the plate or the container is substantially constant before and after a shift of the measuring object, the plate or the container. Consequently, it is possible to carry out measurement without performing focusing again at a new measurement place after a shift, so that a series of measurements can be rapidly carried out.

Further, when a sample having a sufficient width in the moving direction of the sample, the plate or the container, and a sufficient depth in the axial direction of the apical lens is provided as a measuring object, a distance WD from the apical lens to a focal point (an operating distance) is constant, and a distance from the apical lens to the measuring object, the plate or the container is constant. For this reason, it is possible to carry out precise measurement because a focal point remains in the sample even when the measuring object, the plate or the container shifts.

In a second aspect of the present invention, the apex of the lens frame is at a maximum distance so as to be farthest away in the central axial direction from the apical surface of the apical lens, i.e., a convex portion, and a point to which a distance from a position for supporting the apical lens is greater than or equal to zero, and less than the maximum distance, i.e., a concave portion. If the objective having the apex of the lens frame in such a shape is used as an immersion objective, a liquid for immersion circulates inside and outside the apex of the lens frame on the apical lens via the concave portion, and it is possible to carry out observation or measurement while maintaining immersion.

In a third aspect of the present invention, a resin member having a self-lubricating property is used as the apex of the lens frame. If such a resin member is used as the apex of the lens frame, the measuring object, the plate or the container cannot be damaged when the apex of the lens frame contacts the measuring object, the plate or the container. Further, there is less friction between the apex of the lens frame and the measuring object, the plate or the container when the measuring object, the plate or the container shifts. As a consequence, vibration of the measuring object, the plate or the container can be prevented, which can maintain the stability of the measuring object. In addition, a series of measurements can be rapidly carried out because the measuring object, the plate or the container can be smoothly shifted. The apex of the lens frame may be coated with a fluorocarbon resin.

In a fourth aspect of the present invention, the apex of the lens frame has a convex portion which projects outward in the central axial direction of the apical lens from the apical surface of the apical lens. Namely, when the objective is provided such that the apical lens turns upward, the apex of the lens frame is at a position higher than the apical surface of the apical lens. Then, a measuring object, a plate which supports the measuring object, or a container which houses the measuring object is made to have contact with the apex of the lens frame, and while maintaining the contact, the measuring object, the plate or the container and the objective are relatively shifted in a plane perpendicular to the central axis of the objective.

According to the fourth aspect, the apex of the lens frame serves as a spacer between the apical lens and the measuring object, the plate or the container to maintain a distance from the measuring object, the plate or the container to the apical lens substantially constant by having contact therewith, which prevents the apical lens from having contact with the measuring object, the plate or the container.

Because the measuring object, the plate or the container shifts in a state in which the apex of the lens frame is in contact with the measuring object, the plate or the container, it is possible to carry out measurement without the lens frame colliding with the measuring object, the plate or the container. Further, a distance from the apical lens to the measuring object, the plate or the container is substantially constant before and after a shift of the measuring object, the plate or the container. This makes it possible to carry out measurement without performing focusing again at a new measurement place after a shift, and a series of measurements can be rapidly carried out.

When a sample having a sufficient width in the moving direction of the sample, the plate or the container, and a sufficient depth in the axial direction of the apical lens is provided as a measuring object, a distance WD from the apical lens to a focal point (an operating distance) is constant, and a distance from the apical lens to the measuring object, the plate or the container is constant. Consequently, precise measurement can be carried out because a focal point remains in the sample even when the measuring object, the plate or the container shifts.

In a fifth embodiment of the present invention, the objective shifts along the central axial direction to have contact with the measuring object, the plate or the container. According to the fifth embodiment, vibration of the measuring object is suppressed due to the objective shifting to maintain an accurate contact, and the objective can be rapidly shifted. Further, positions of the objective and optical systems before and after the objective, such as, for example, a light source, a light path, a mirror, and a detector, are fixed in such a manner that the measuring object, the plate or the container shifts in a plane perpendicular to the central axis of the objective, so that measurements can be accurately carried out.

In a sixth aspect of the present invention, at the time of determining a focal position of the objective, a focal position is determined within a range in which a measuring object is present. A focal position thereof in the central axial direction is to be determined at a position further away than a maximum displacement from a boundary of the measuring object in the central axial direction, for example, the upper limit and the lower limit, on the basis of the maximum displacement in the central axial direction with respect to a contact surface between the measuring object, the plate or the container and the apex of the lens frame. According to the sixth aspect, a focal point remains in the measuring object even if the contact surface is displaced in the central axial direction. Once a focal position is determined, measurement can be immediately started without performing focusing every time the measuring object, the plate or the container shifts.

In a seventh aspect of the present invention, the apex of the lens frame has a convex portion which projects outward in the central axial direction of the apical lens from the apical surface of the apical lens. Namely, when the objective is provided such that the apical lens turns upward, the apex of the lens frame is at a position higher than the apical surface of the apical lens. Moreover, contact means brings a measuring object, a plate which supports the measuring object, or a container which houses the measuring object into contact with the apex of the lens frame, and shifting means shifts the measuring object, the plate or the container, and the objective relatively in a plane perpendicular to the central axis of the objective while maintaining the contact.

According to the seventh aspect, the apex of the lens frame serves as a spacer between the apical lens and the measuring object, the plate or the container to maintain a distance from the measuring object, the plate or the container to the apical lens substantially constant by having contact therewith, which prevents the apical lens from having contact with the measuring object, the plate or the container.

Further, the measuring object, the plate or the container shifts in a state in which the apex of the lens frame is in contact with the measuring object, the plate or the container. This makes it possible to carry out measurement without the lens frame colliding with the measuring object, the plate or the container.

Furthermore, a distance from the apical lens to the measuring object, the plate or the container is substantially constant before and after a shift. Consequently, it is possible to carry out measurement without performing focusing again at a new measurement place after a shift, and a series of measurements can be rapidly carried out.

In addition, when a sample having a sufficient width in the moving direction of the sample, the plate or the container, and a sufficient depth in the axial direction of the apical lens is provided as a measuring object, a distance WD from the apical lens to a focal point (an operating distance) is constant, and a distance from the apical lens to the measuring object, the plate or the container is constant. As a consequence, precise measurement can be carried out because a focal point remains in the sample even when the measuring object, the plate or the container shifts.

In an eighth aspect of the present invention, an elastic member supports the apical lens and the lens frame which supports the apical lens by exerting a bias force in the central axial direction of the apical lens. According to the eighth aspect, the elastic member presses the lens frame against a surface of the measuring object, the plate or the container facing the objective. As a consequence, the apex of the lens frame is always in contact with the measuring object, the plate or the container even when a point of contact in the central axial direction is changed due to the point of contact shifting in a plane perpendicular to the central axis of the apical lens. Further, the elastic member absorbs vibration at the time of the objective contacts the measuring object, the plate or the container, and absorbs a positional change of the point of contact in the central axial direction, so that vibration of the measuring object can be reduced.

In a ninth aspect of the present invention, an objective shifting device brings the measuring object, the plate, or the container into contact with the apex of the lens frame by shifting the objective in the central axial direction. According to the ninth aspect, a shift while contact can be accurately and rapidly carried out due to the objective shifting.

In a tenth aspect of the present invention, an elastic member supports the objective frame by exerting a bias force in the central axial direction of the objective frame. According to the tenth aspect, the elastic member presses the objective against a surface of a measuring object, a plate which supports the measuring object, or a container which houses the measuring object facing the objective. Accordingly, even when a point of contact shifts in a plane perpendicular to the central axis of the apical lens so that the point of contact in the central axial direction is changed, the apex of the lens frame is always in contact with the measuring object, the plate or the container. Further, the elastic member absorbs a positional change of the point of contact in the central axial direction, so that vibration of the measuring object can be reduced.

In an eleventh aspect of the present invention, a stage supports the measuring object, the plate or the container, and a shift thereof in the central axial direction is restricted. According to the eleventh aspect, a shift of the measuring object, the plate or the container in the central axial direction is restricted, and thus, vibration of the measuring object can be reduced, which can maintain the stability of the measuring object.

In a twelfth aspect of the present invention, a stage supports the measuring object, the plate or the container, and shifts those in a plane perpendicular to the central axial direction. According to the twelfth aspect, measurement can be accurately carried out because the shift of the stage does not affect the objective and the optical systems in front of and behind the objective, such as, for example, a light source, a light path, a mirror, and a detector.

In a thirteenth aspect of the present invention, a shift of the objective in a plane perpendicular to the central axial direction is restricted. According to the thirteenth aspect, because a shift of the objective in a plane perpendicular to the central axial direction is restricted, positions of the optical systems in front of and behind the objective, such as a light source, a light path, a mirror, and a detector are fixed, and consequently, measurement can be more accurately carried out.

In a fourteenth aspect of the present invention, an elastic member supports an apical lens and a lens frame which supports the apical lens by exerting a bias force in the central axial direction of the apical lens. Moreover, when the apex of the lens frame is outside the central axial direction of the apical lens more than the apical surface of the apical lens, i.e., when the objective is provided such that the apical lens turns upward, the apex of the lens frame is at a position higher than the apical surface of the apical lens. Further, an objective shifting device brings a measuring object, a plate or a container into contact with the apex of the lens frame by shifting the objective in the central axial direction, and a stage supports the measuring object, the plate or the container, and shifts in a plane perpendicular to the central axial direction while a shift thereof in the central axial direction is restricted.

According to the fourteenth aspect, the elastic member presses the lens frame against a surface of the measuring object, the plate or the container facing the objective. Consequently, even when a point of contact shifts in a plane perpendicular to the central axis so that a position of the point of contact in the central axial direction is changed, the apex of the lens frame is always in contact with the measuring object, the plate or the container. Further, the elastic member absorbs vibration at the time of contacting between the measuring object, the plate or the container, and the objective, and absorbs a positional change of the point of contact in the central axial direction, so that vibration of the measuring object can be reduced.

The apex of the lens frame serves as a spacer between the apical lens and the measuring object, the plate or the container to maintain a distance from the measuring object, the plate or the container to the apical lens substantially constant by having contact therewith, which prevents the apical lens from having contact with the measuring object, the plate or the container.

Because the measuring object, the plate or the container shifts in a state in which the apex of the lens frame is in contact with the measuring object, the plate or the container, it is possible to carry out measurement without the lens frame and the measuring object, the plate or the container colliding. Further, a distance from the apical lens to the measuring object, the plate or the container is substantially constant before and after a shift. As a consequence, it is possible to carry out measurement without performing focusing again at a new measurement place after a shift, and a series of measurements can be rapidly carried out.

In addition, when a sample having a sufficient width in the moving direction of the sample, the plate or the container, and a sufficient depth in the axial direction of the apical lens is provided as a measuring object, a distance WD from the apical lens to a focal point (an operating distance) is constant, and a distance from the apical lens to the measuring object, the plate or the container is constant. Therefore, precise measurement can be carried out because a focal point remains in the sample even when the measuring object, the plate or the container shifts.

Further, at the time of contact, a shift while contact can be accurately and rapidly carried out due to the objective shifting.

Furthermore, at the time of measurement, a shift of the stage does not affect on the objective and optical systems in front of and behind the objective, such as, for example, a light source, a light path, a mirror, and a detector, so that the measurement can be accurately carried out. Moreover, because a shift of the measuring object, the plate or the container in the central axial direction is restricted, vibration of the measuring object can be reduced, which can maintain the stability of the measuring object.

In a fifteenth aspect of the present invention, the apex of the lens frame has a convex portion which projects outward in the central axial direction from the apical surface of the apical lens. When the objective is provided such that the apical lens turns upward, the apex of the lens frame is at a position higher than the apical surface of the apical lens. Further, an objective shifting device brings a measuring object, a plate or a container into contact with the apex of the lens frame by shifting the objective in the central axial direction. Moreover, an elastic member supports the objective by exerting a bias force in the central axial direction, and the stage supports the measuring object, the plate or the container, and shifts in a plane perpendicular to the central axial direction while a shift thereof in the central axial direction is restricted.

According to the fifteenth aspect, the apex of the lens frame serves as a spacer between the apical lens and the measuring object, the plate or the container to maintain a distance from the measuring object, the plate or the container to the apical lens substantially constant by having contact therewith, which prevents the apical lens from having contact with the measuring object, the plate or the container. The elastic member presses the lens frame against a surface of the measuring object, the plate or the container facing the objective. Accordingly, even when a point of contact shifts in a plane perpendicular to the central axis of the apical lens so that a position of the point of contact in the central axial direction is changed, the apex of the lens frame is always in contact with the measuring object, the plate or the container. Further, the elastic member absorbs vibration at the time of contacting between the measuring object, the plate or the container, and the objective, and absorbs a positional change of the point of contact in the central axial direction, so that vibration of the measuring object can be reduced.

Because the measuring object, the plate or the container shifts in a state in which the apex of the lens frame is in contact with the measuring object, the plate or the container, it is possible to carry out measurement without the lens frame and the measuring object, the plate or the container colliding. Further, a distance from the apical lens to the measuring object, the plate or the container is substantially constant before and after a shift. Consequently, it is possible to carry out measurement without performing focusing again at a new measurement place after a shift, and a series of measurements can be rapidly carried out.

Further, when a sample having a sufficient width in the moving direction of the sample, the plate or the container, and a sufficient depth in the axial direction of the apical lens is provided as a measuring object, a distance WD from the apical lens to a focal point (an operating distance) is constant, and a distance from the apical lens to the measuring object, the plate or the container is constant. As a consequence, precise measurement can be carried out because a focal point remains in the sample even when the measuring object, the plate or the container shifts.

At the time of contact, a shift while contact can be accurately and rapidly carried out due to the objective shifting.

Furthermore, at the time of measurement, a shift of the stage does not affect on the objective and the optical systems in front of and behind the objective, such as, for example, a light source, a light path, a mirror, and a detector, so that measurement can be accurately carried out. In addition, because a shift of the measuring object, the plate or the container in the central axial direction is restricted, and thus, vibration of the measuring object can be reduced, this can maintain the stability of the measuring object.

In a sixteenth aspect of the present invention, the apex of the lens frame has a convex portion which projects outward in the central axial direction of the apical lens from the apical surface of the apical lens. When the objective is provided such that the apical lens turns upward, the apex of the lens frame is at a position higher than the apical surface of the apical lens, and an adjusting device brings the measuring object, the plate, or the container into contact with the apex of the lens frame.

According to the sixteenth aspect, the apex of the lens frame serves as a spacer between the apical lens and the measuring object, the plate or the container to maintain a distance from the measuring object, the plate or the container to the apical lens substantially constant by having contact therewith, which prevents the apical lens from having contact with the measuring object, the plate or the container. Further, even when a point of contact shifts in a plane perpendicular to the central axis of the measuring object, the plate or the container so that a position of the point of contact in the central axial direction is changed, the apex of the lens frame is maintained in contact with the measuring object, the plate or the container by an adjusting device. Accordingly, it is possible to carry out observation without the lens frame colliding into the observing object when the measuring object, the plate or the container shifts.

Because a distance from the apical lens to the observing object, the plate or the container is substantially constant before and after a shift of the observing object, the plate or the container, it is possible to carry out observation without performing focusing again at a new observation place after a shift, and a series of observations can be rapidly carried out.

Further, when a sample having a sufficient width in the moving direction of the sample, the plate or the container, and a sufficient depth in the axial direction of the apical lens is provided as an observing object, a distance WD from the apical lens to a focal point (an operating distance) is constant, and a distance from the apical lens to the observing object, the plate or the container is constant. Consequently, observation can be exactly carried out because a focal point remains in the sample even when the observing object, the plate or the container shifts.

DETAILED DESCRIPTION OF THE INVENTION

Hereinafter, embodiments of the present invention will be described in accordance with the drawings.

FIRST EMBODIMENT

Figure 1:
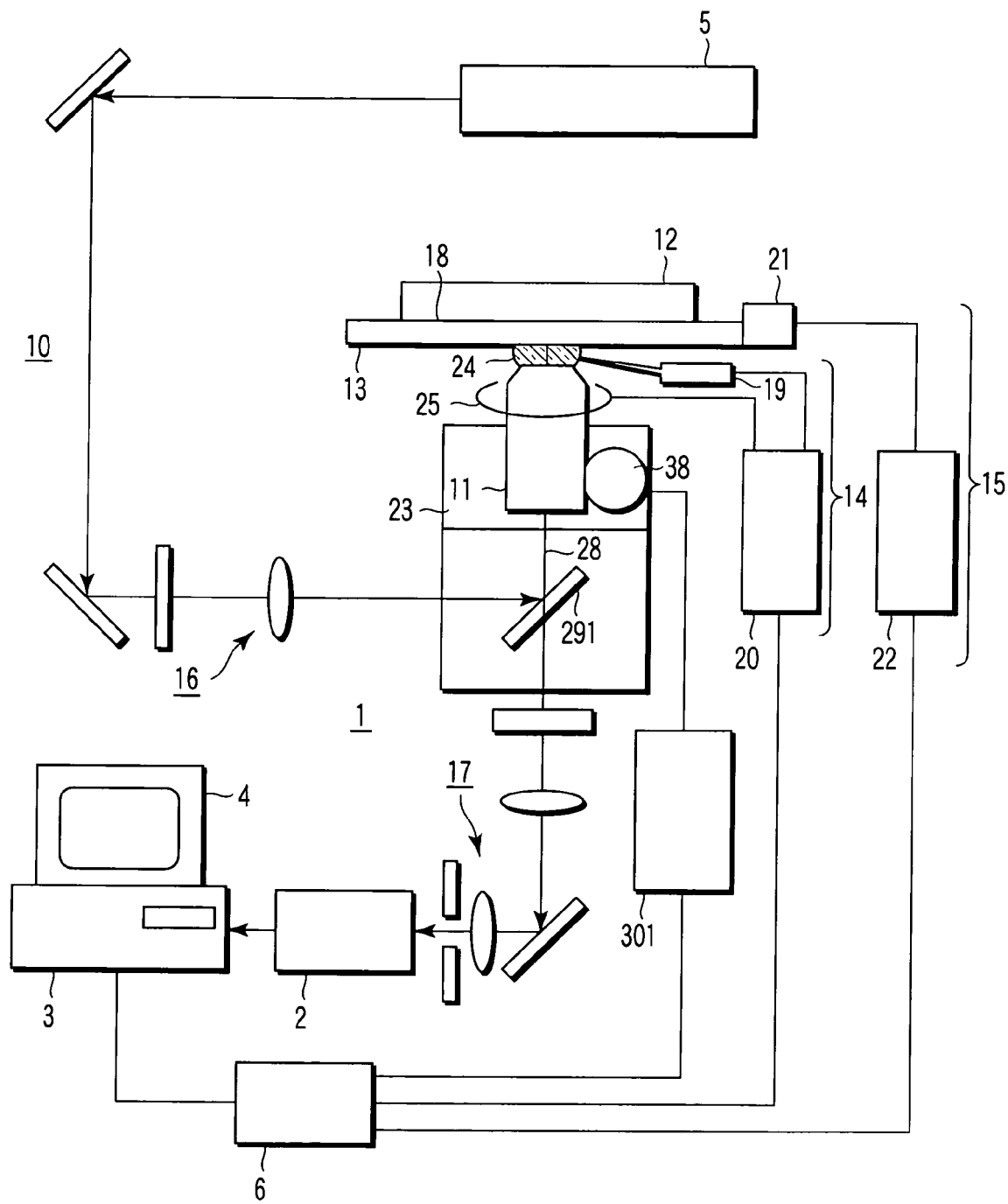
FIG. 1 is a diagram showing a schematic configuration of a fluorescence analyzer according to a first embodiment of the present invention.
Figure 3:
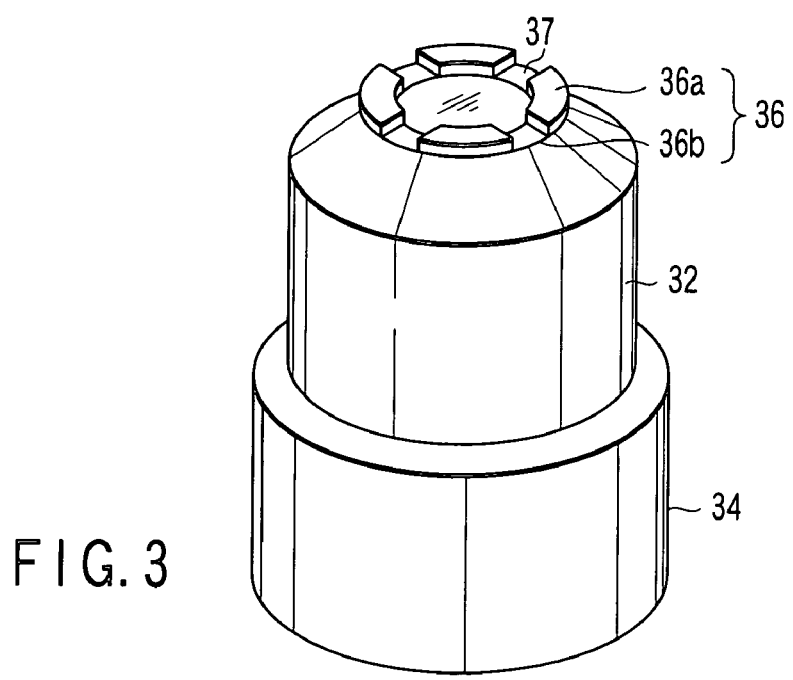
FIG. 3 is a view showing an apex of a lens frame of the immersion objective for use in the first embodiment.

FIG. 1 is a diagram showing a schematic configuration of a fluorescence analyzer serving as an optical analyzer to which the present invention is applied. In FIG. 1, a fluorescence analyzer main body 10 has: a light source 5; an inverted fluorescence microscope 1 which uses a confocal optical system; a photoelectric signal converter unit 2 serving as electric signal conversion means for acquiring fluorescence emitted from a fluorescence-labeled sample to be converted into an electric signal; a data processing unit 3 serving as data processing means for determining a characteristic of the sample on the basis of measured data determined in the photoelectric signal converter unit 2; and a display device 4 which displays various characteristics of the sample on the basis of measured data determined in the data processing unit 3. The fluorescence analyzer main body 10 further has a control unit 6 (refer to FIG. 3 which will be described later) which controls the above-described respective units.

The light source 5 has, for example, a laser beam generator device. The photoelectric signal converter unit 2 has a photo multiplier and an avalanche photodiode.

The inverted fluorescence microscope 1 has a stage 13 which supports a micro plate 12 with a measuring object thereon. The stage 13 has a stage driving device 15 having a shifting device 21 and a driving control device 22. The shifting device 21 shifts the stage 13 in the X-Y direction such that the micro plate 12 shifts in a plane perpendicular to an optical axis 28. Namely, a shift of the stage 13 in the optical axis 28 direction is restricted, and only a shift thereof in a plane perpendicular to the optical axis 28 is permitted. The driving control device 22 controls to drive the shifting device 21 on the basis of a command from the control unit 6.

As the micro plate 12, a micro plate is preferably used which has formed therein a plurality of concave portions for housing samples serving as measuring objects, and which transmits the light from the light source 5.

An immersion objective 11 is arranged under the stage 13 so as to be close to the micro plate 12. An objective shifting device 23 is provided to the immersion objective 11. The objective shifting device 23 is controlled to drive by the driving control device 301 on the basis of a command from the control unit 6, whereby the immersion objective 11 can be driven in the optical axis 28 direction.

A liquid supply and recovery device 14 which supplies a liquid is provided around the immersion objective 11 and the micro plate 12.

The liquid supply and recovery device 14 has: a supply nozzle 19 for supplying a liquid 24 between a bottom face 18 of the micro plate 12 and the immersion objective 11; a liquid tray 25 which is attached to the circumference of the immersion objective 11, and which prevents the supplied liquid 24 from flowing into the parts of the immersion objective 11 and devices thereunder; a liquid measure adjusting device 20 which adjusts an amount of the liquid 24 to be supplied, and which recovers the liquid from the liquid tray 25; and the like.

A dichroic mirror 291 is arranged on the optical axis 28 of the immersion objective 11. The dichroic mirror 291 has a characteristic of reflecting short-wavelength light and transmitting long-wavelength light. The dichroic mirror 291 reflects on the immersion objective 11 light of a wavelength of excitation light made to be incident via an illumination light path 16 from the light source 5, and transmits light of a wavelength of fluorescence which is incident from the immersion objective 11 to be incident into the photoelectric signal converter unit 2 via a photodetector light path 17.

With such a configuration, the stage 13 which supports the micro plate 12 above the immersion objective 11 shifts the micro plate 12 in a plane perpendicular to the optical axis 28. A shift of the stage 13 in the optical axis 28 direction is restricted, and therefore, vibration of a sample in the micro plate 12 can be reduced, which can maintain the stability of a state of the sample. Further, the micro plate 12 shifts only in a plane perpendicular to the optical axis 28, whereby it is possible to fix positional relationships between the immersion objective 11 and optical systems in front of and behind the immersion objective 11, such as the light source 5, the illumination light path 16, the photodetector light path 17, and the photoelectric signal converter unit 2. Accordingly, an optical measurement accuracy can be stably maintained.

Figure 2:
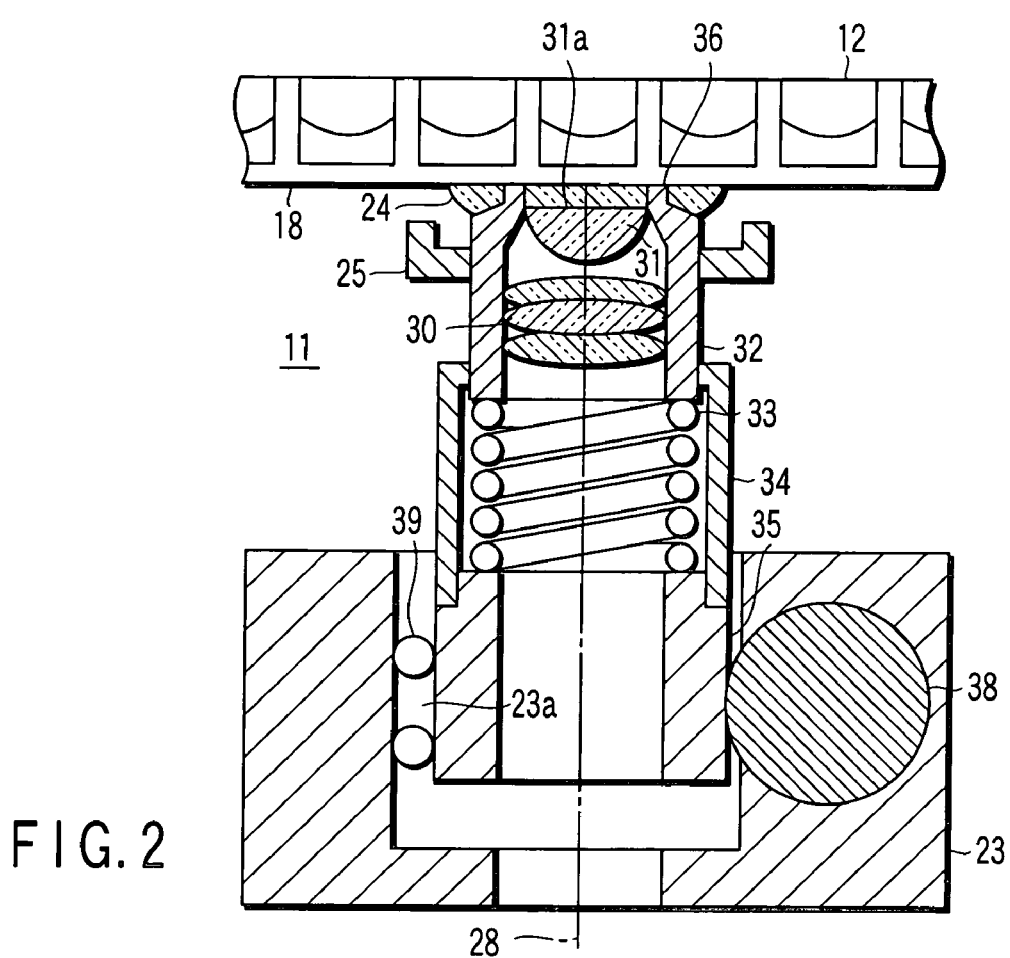
FIG. 2 is a view showing a lens axial cross section of an immersion objective for use in the first embodiment.

FIG. 2 shows a cross-sectional view of the immersion objective 11 in the lens axial direction.

In FIG. 2, the immersion objective 11 has a tubular lens frame 32. An apical lens 31 and a lens group 30 are contained along the optical axis 28 in a hollow portion of the lens frame 32.

The lens frame 32 has a lens frame apex 36 which projects outward in the direction of the optical axis 28 (the central axis of the apical lens 31) further than an apical surface 31a of the apical lens 31. As a consequence, when the immersion objective 11 is installed such that the apical lens 31 turns upward, the lens frame apex 36 is at a position higher than the apical surface 31a of the apical lens 31.

On the lens frame apex 36, are formed convex portions 36a, having a maximum distance from the apical surface 31a of the apical lens 31 in the central axial direction, and concave portions 36b, which are at a distance from the point of support for the apical lens 31 greater than or equal to zero, and is less than the maximum distance. The concave portions 36b, are formed in order for the liquid 24 to circulate around inside and outside the lens frame apex 36 when the liquid 24 is supplied on the immersion objective 11.

Note that a resin having self-lubricating property is used as a material of the lens frame apex 36. For example, a soft material such as polyacetal is preferable as a material of the lens frame apex 36. By using such a resin, the bottom face 18 of the micro plate 12 does not get scratched when the lens frame apex 36 touches the bottom face 18. Further, there is less friction between the lens frame apex 36 and the bottom face 18 when the micro plate 12 shifts. Thus, transfer of vibration to the micro plate 12 can be prevented, which can maintain the stability of the state of a sample. In addition, a series of measurements can be rapidly carried out because the micro plate 12 can be smoothly shifted.

In this way, the lens frame 32 is inserted into the hollow portion of the external cylinder 34 such that an edge portion opposite to the lens frame apex 36 is movable. The external cylinder 34 is fixed to an objective mounting platform 35 of the objective shifting device 23. In the hollow portion of the external cylinder 34, an elastic member 33 is arranged between the lens frame 32 and the objective mounting platform 35. The elastic member 33 exerts a bias force on the objective mounting platform 35 such that the lens frame 32 turns to the direction of the micro plate 12 (upward on the paper) so as to be parallel to the optical axis 28 (in the central axial direction of the apical lens 31). Further, the elastic member 33 has a role of absorbing vibration generated at the time of contact between the lens frame apex 36 of the lens frame 32 and the bottom face 18 of the micro plate 12, and a role of absorbing vibration while maintaining the contact therebetween. For example, a metal spring, an air spring, or the like is used as the elastic member 33, and additionally, in place of the elastic member 33, a substance having a restoring force or a repulsive force of a magnet may be utilized.

Note that the liquid tray 25 to be used for the liquid supply and recovery device 14 described above is provided to the circumference of the lens frame 32.

On the other hand, the tubular hollow portion 23a is formed along the optical axis 28 in the objective shifting device 23. The objective mounting platform 35 is provided in the hollow portion 23a so as to be movable along the optical axis 28. Further, the objective shifting device 23 has a feeding mechanism 38 for shifting the objective mounting platform 35 in the optical axis 28 direction, and guides 39 for maintaining the objective mounting platform 35 in the horizontal direction in the hollow portion 23a. Consequently, the objective mounting platform 35 to which the immersion objective 11 is mounted is restricted in a shift in a plane perpendicular to the optical axis 28, and only a shift in the direction of the optical axis 28 (the central axis of the apical lens 31) is permitted.

With such a configuration, when the feeding mechanism 38 shifts the objective mounting platform 35 upward along the optical axis 28 at the time of driving, the objective mounting platform 35 shifts up to a position where the lens frame apex 36 is pressed against the bottom face 18 of the micro plate 12 by a bias force of the elastic member 33.

In this state, even if the micro plate 12 shifts in the X-Y direction, i.e., in the horizontal direction (the directions of the left and right/front depth on the paper of FIG. 1), and a position of the bottom face 18 of the micro plate 12 is changed with respect to the optical axis 28, the lens frame apex 36 always has stable contact with the bottom face 18.

Also, even if, in this state, the immersion objective 11 is shifted in the optical axis 28 direction by the objective shifting device 23 as well, vibration of the micro plate 12 can be suppressed, and the lens frame apex 36 and the bottom face 18 can be made to accurately contact one another. In addition, the immersion objective 11 can be rapidly shifted.

Figure 4:
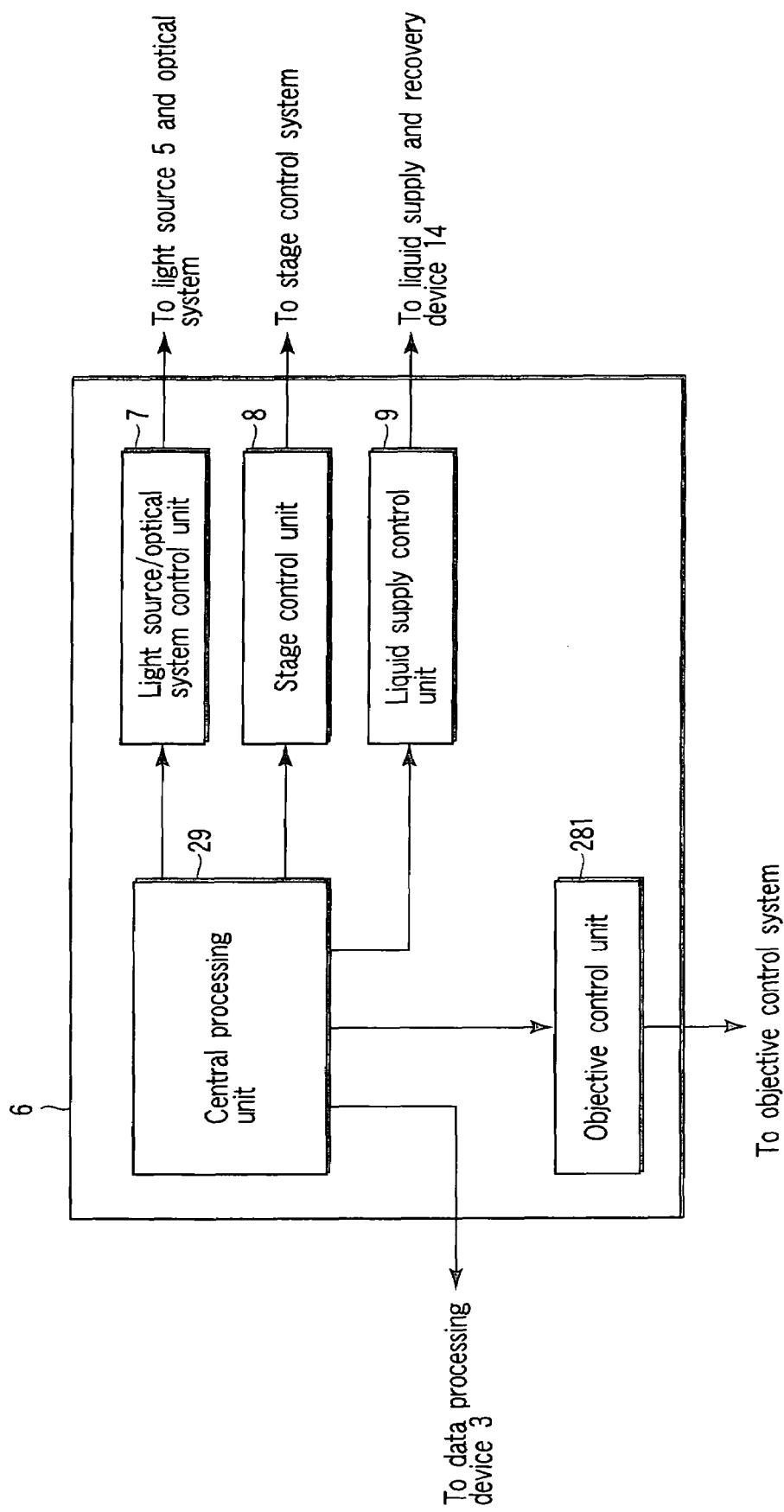
FIG. 4 is a diagram showing a schematic configuration of a control unit for use in the first embodiment.

FIG. 4 shows the details of the control unit 6.

In this case, the control unit 6 has a central processing unit (CPU) 29. The central processing unit 29 is connected to a light source/optical system control unit 7 which controls respectively the optical systems of the light source 5, the illumination light path 16, and the photodetector light path 17; a stage control unit 8, which controls shifting of the stage 13; a liquid supply control unit 9, which controls the liquid supply and recovery device 14; and an objective control unit 281, which controls shifting and focusing of the immersion objective 11. The central processing unit 29 gives predetermined commands to the light source/optical system control unit 7, stage control unit 8, liquid supply control unit 9, and objective control unit 281 in accordance with the operation procedures of the fluorescence analyzer main body 10 which are determined in advance (refer to FIG. 5).

Next, the operation procedures of the fluorescence analyzer main body 10 configured as described above will be described in accordance with FIG. 5.

First, the micro plate 12 is set on the stage 13 (step 501). Then, the central processing unit 29 of the control unit 6 gives the stage control unit 8 a command to shift the stage 13 to a position determined in advance, for example, a position where a specific well of the micro plate 12 is shifted on the optical axis 28 of the immersion objective 11.

The stage control unit 8 transmits a command to shift the stage to the driving control device 22, and the driving control device 22 provides a shift amount of the stage to the shifting device 21. As a consequence, the shifting device 21 shifts the stage 13 by a distance based on the command from the stage control unit 8 (step 502).

Before starting measurement, the central processing unit 29 gives the liquid supply control unit 9 a command to supply a liquid on the apical lens 31 of the immersion objective 11.

The liquid supply control unit 9 drives the liquid measure adjusting device 20 in accordance with the command from the central processing unit 29. The liquid measure adjusting device 20 makes a liquid sphere by supplying the liquid 24 of an amount determined in advance from the supply nozzle 19 onto the apical surface 31a of the apical lens 31 surrounded by the lens frame apex 36 of the immersion objective 11 (step 503). At this time, the liquid 24 overflowed from the lens frame apex 36 of the circumference of the apical lens 31 is collected in the liquid tray 25, and thereafter, is recovered in the liquid measure adjusting device 20.

Next, the central processing unit 29 commands the objective control unit 28 to carry out shifting and focusing of the immersion objective 11, and moreover, commands it to supply light to the light source/optical system control unit 7.

The objective control unit 28 transmits a command to shift the immersion objective 11 to the objective shifting device 23. The objective shifting device 23 shifts the objective mounting platform 35 in the direction of the micro plate 12 (upward on the paper) by driving the feeding mechanism 38 (step 504).

At this time, the objective shifting device 23 shifts the objective mounting platform 35 up to a position where the lens frame apex 36 touches the bottom face 18 of the micro plate 12, and a position where a bias force of the elastic member 33 is added to the bottom face 18 of the micro plate 12 through the lens frame apex 36. When the objective mounting platform 35 shifts up to this position, the lens frame apex 36 of the immersion objective 11 is pressed against the bottom face 18 in a state in which a shift in the optical axis 28 direction of the micro plate 12 is restricted. Accordingly, even if a position of the bottom face 18 is changed by shifting the micro plate 12 in a plane perpendicular to the optical axis 28, the lens frame apex 36 is always in contact with the bottom face 18. More specifically, assume that the micro plate 12 is shifted in a plane perpendicular to the optical axis 28 in a state in which the lens frame apex 36 is always in contact with the bottom face 18 of the micro plate 12. In this case, measurement can be carried out without the lens frame 32 and the bottom face 18 of the micro plate 12 colliding even if there is a strain in the micro plate 12 or a thickness of the bottom is uneven, or even if a position of the bottom face 18 of the micro plate 12 in the height direction is changed due to the bottom face 18 having undulation even when a thickness of the micro plate 12 is even. Furthermore, an elastic force of the elastic member 33 absorbs a change of the position of the bottom face 18 of the micro plate 12, and which can reduce vibration of a sample 231 (which will be described later) in the micro plate 12, and consequently, the sample 231 can be stably maintained.

Next, at the same time as the light source/optical system control unit 7 supplies a laser beam to the light source 5 for a time determined in advance, the objective control unit 28 carries out focusing of the immersion objective 11 (step 505).

Figure 6:
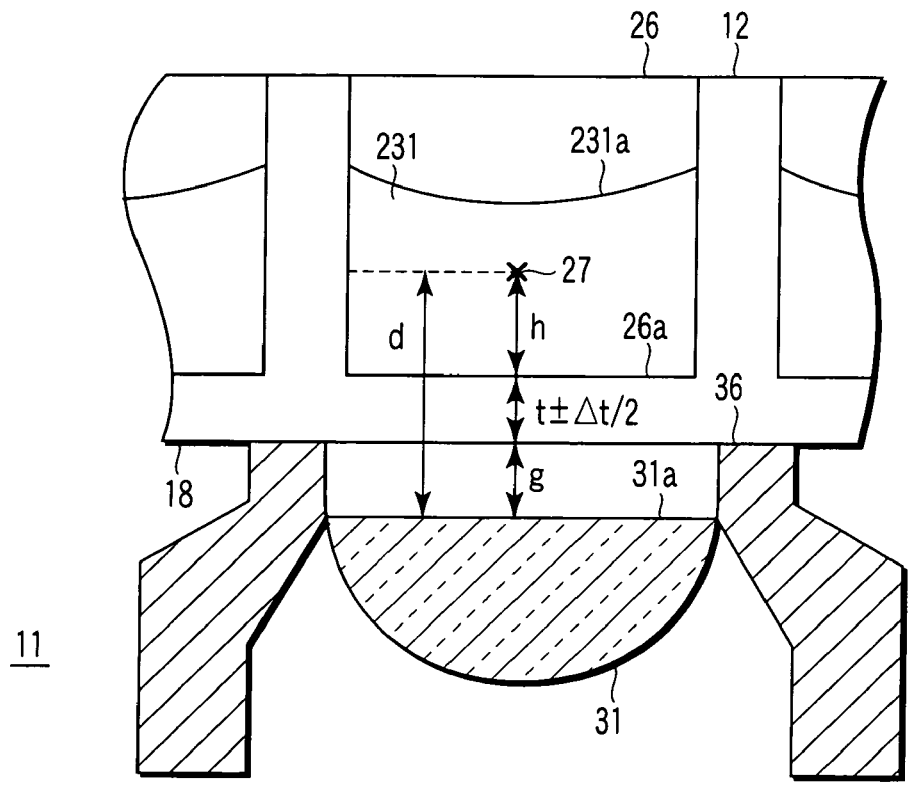
FIG. 6 is a view for explanation of a relationship between a focal position of the immersion objective of the first embodiment and a displacement of a bottom face of a micro plate.

In this case, as shown in FIG. 6, a position of a focal point 27 is determined to be a position in a sufficient depth of the well 26 on the basis of a maximum displacement Δt of the bottom face 18 of the macro plate 12 determined in advance. The position is between a bottom face 26a of the well 26 and a liquid level 231a of the sample 231, and is higher than Δt from the bottom face 26a of the well 26 and is lower than Δt from the liquid level 231a.

Next, the central processing unit 29 commands the data processing unit 3 to start data processing by carrying out measurement of fluorescence. The data processing unit 3 carries out measurement and data processing in accordance with the command from the central processing unit 29 (step 506). At this time, the photoelectric signal converter unit 2 acquires fluorescence generated from the fluorescence-labeled sample 231, and converts the acquired fluorescence into an electric signal to be determined as measured data. The data processing unit 3 determines a characteristic of the sample 231 on the basis of the determined measured data.

Next, the central processing unit 29 commands the stage control unit 8 to shift the stage 13 such that the well 26 serving as the next measuring object comes above the immersion objective 11. The stage control unit 8 transmits a command to shift the stage to the driving control device 22. The driving control device 22 provides a shift amount to the shifting device 21. As a consequence, the shifting device 21 shifts the micro plate 12 along with the stage 13 in the horizontal direction (step 507).

Hereinafter, until the measurement in the well 26 set for a measuring object is completed, measurement of fluorescence and a shift of the stage 13 are repeated by steps 506 and 507 (NO in step 508). Then, when the measurement at the predetermined position is completed (YES in step 508), the central processing unit 29 commands the objective control unit 28 to keep the immersion objective 11 away from the micro plate 12. The objective control unit 28 commands the objective shifting device 23 to shift the immersion objective 11. The objective shifting device 23 shifts the objective mounting platform 35 in a direction away from the micro plate 12 (downward on the paper) by driving the feeding mechanism 38 (step 509). Thereafter, the micro plate 12 is exchanged, and then the processing is completed (step 510).

Figure 7A:
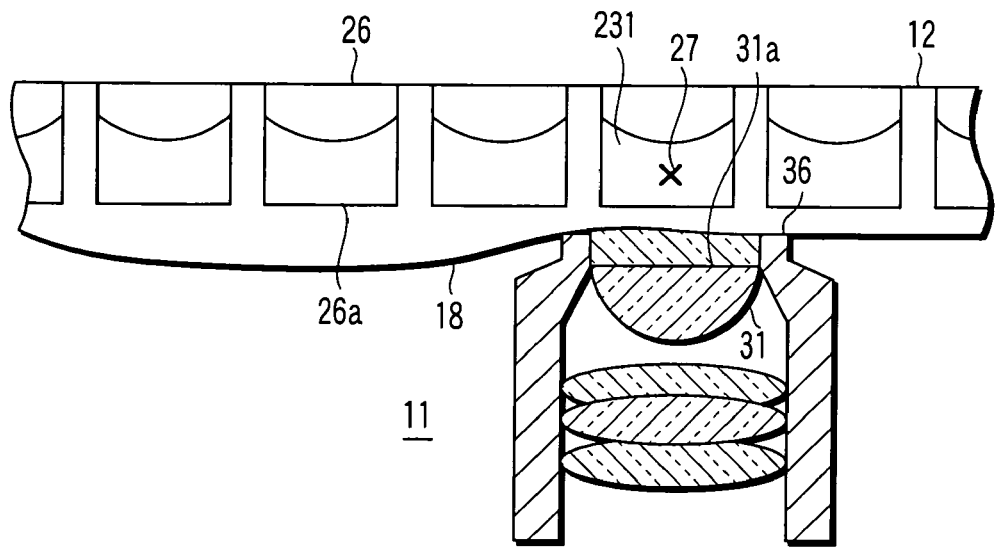
FIG. 7A and FIG. 7B are views for explanation of a relationship between a focal position of the immersion objective of the first embodiment and a displacement of the bottom face of the micro plate.
Figure 7B:
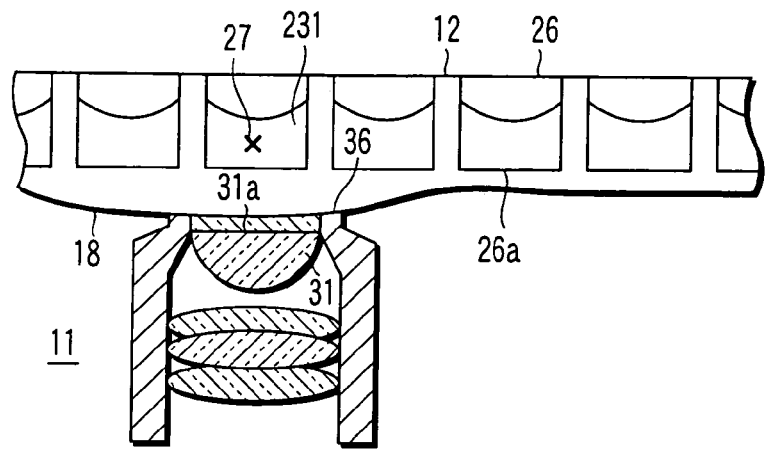

Next, the relationship between a position of the focal point 27 of the immersion objective 11 and a displacement of the bottom face 18 of the micro plate 12 will be described by using FIGS. 7A and 7B.

In this case, as shown in FIG. 6, suppose that a thickness t of the bottom of the micro plate 12 is uneven, and a maximum displacement of the bottom face 18 is Δt. Further, as a relationship between the immersion objective 11 and a position of the focal point 27 when the thickness t of the bottom of the micro plate 12 is uneven, the bottom of the micro plate 12 may be thin as shown in FIG. 7A, and the bottom may be thick as shown in FIG. 7B.

In this state, as shown in FIG. 6, a distance d from the apical surface 31a of the apical lens 31 to the focal point 27 is a sum of a distance g from the apical surface 31a to the bottom face 18 of the micro plate 12, a thickness t±Δt/2 of the bottom of the micro plate 12, and a distance h from the bottom face 26a of the well 26 to the focal point 27. Further, when a focal length of the immersion objective 11 is fixed, the distance h from the bottom face 26a of the well 26 to the focal point 27 depends on the distance g from the apical surface 31a to the bottom face 18 of the micro plate 12. Because the bottom of the micro plate 12 is a solid medium, the distance h does not depend on the thickness t±Δt/2 of the bottom of the micro plate 12. For this reason, the greater the distance g is when the immersion objective 11 is kept away from the micro plate 12, the less the distance h is, and finally, the immersion objective 11 comes out of the well 26.

In contrast thereto, in the first embodiment, the lens frame apex 36 is always in contact with the bottom face 18 of the micro plate 12, and thus a displacement of the distance g from the apical surface 31a of the apical lens 31 to the bottom face 18 is less than or equal to a displacement of the bottom face 18 (i.e., minute). Namely, because the distance g is substantially constant, the distance h is also substantially constant.

Figure 5:
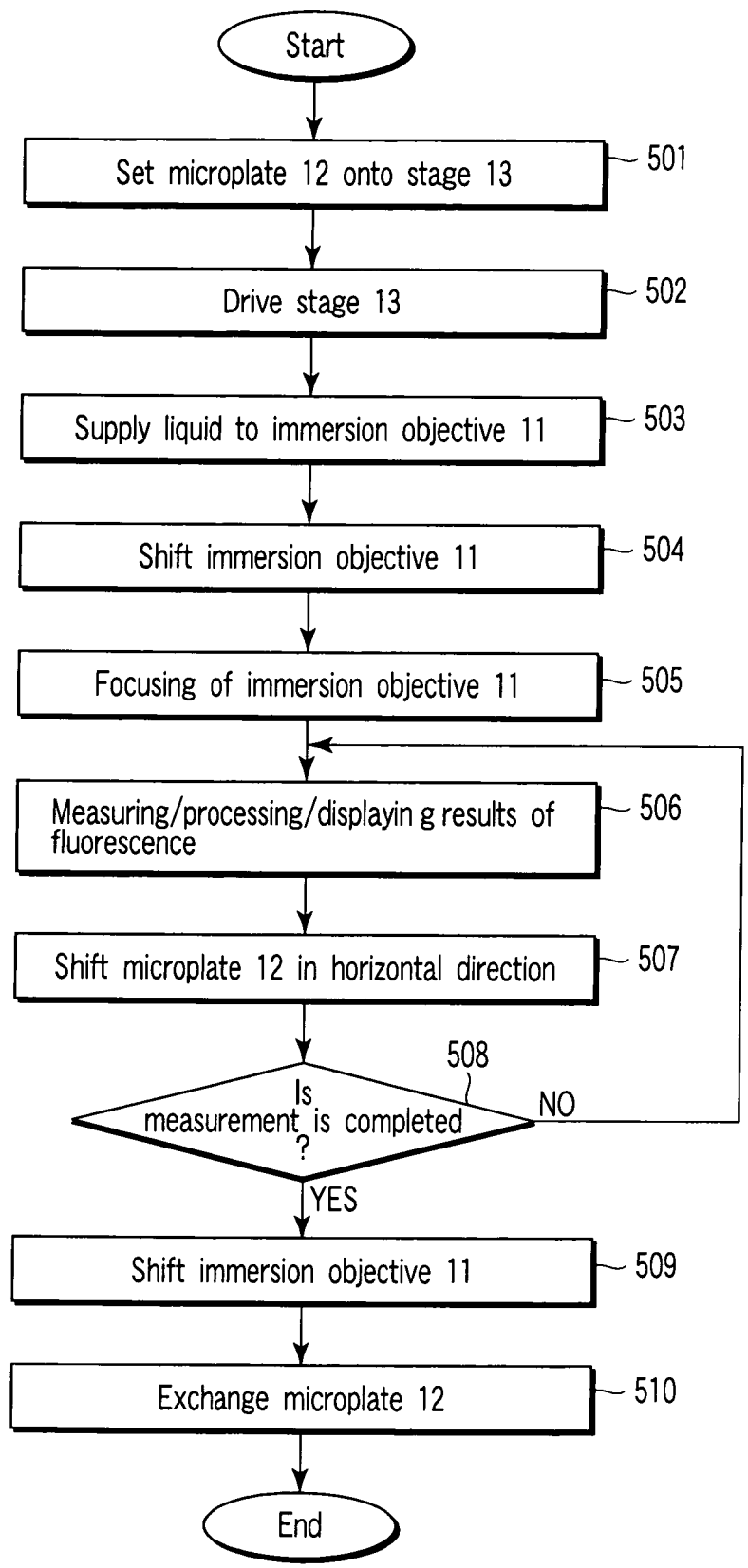
FIG. 5 is a flowchart showing operation procedures of the fluorescence analyzer of the first embodiment.

Then, when, as carried out in steps 504 and 505 shown in FIG. 5, determination of a position of the focal point 27 of the immersion objective 11 is carried out at a position between the bottom face 26a and the liquid level 231a of the sample 231, and higher than a maximum displacement Δt due to the unevenness of the bottom face 18 from the bottom face 26a, and lower than a maximum displacement Δt from the liquid level 231a, the focal point 27 exists in the sample 231 even if the bottom face 18 is displaced. Accordingly, once a focal position is determined by the operation in step 504, the lens frame apex 36 is always in contact with the bottom face 18 of the micro plate 12 even if the well 26 serving as a measuring object is shifted. As a result, measurement can be immediately started without performing focusing every time. Further, in the same manner as in a case where the entire micro plate 12 is strained, the lens frame apex 36 is always in contact with the bottom face 18 of the micro plate 12. Consequently, the focal point 27 exists in the sample even if the well 26 is shifted, and measurement can be immediately started.

In this way, in the first embodiment, the elastic member 33 supports the apical lens 31 and the lens frame 32 which supports the apical lens 31 by exerting a bias force in the central axial direction of the lens frame 32. Then, when the objective is installed such that the apical lens 31 turns upward by causing the apex of the lens frame 32 to project outward in the central axial direction of the apical lens 31 further than the apical surface 31a of the apical lens 31, the apex of the lens frame 32 is at a position higher than the apical surface of the apical lens 31. Further, the objective shifting device 23 shifts the immersion objective 11 in the central axial direction to have contact with the bottom face 18 of the micro plate 12. In addition, the stage 13 supports the micro plate 12, and shifts only in a plane perpendicular to the central axial direction while a shift in the central axial direction is restricted.

As a consequence, the lens frame 32 can be pressed against a face of the micro plate 12 facing the immersion objective 11 by the elastic member 33. Even if there is a strain in the micro plate 12, a thickness of the bottom is uneven, or there is a displacement of a position of the bottom face 18 due to undulation being brought about in the bottom plate even if a thickness is even, it is possible to maintain the state in which the lens frame apex 36 is always in contact with the bottom face 18 of the micro plate 12. Further, the micro plate 12 is shifted in the horizontal direction, whereby it is possible to carry out measurement for fluorescence analysis without the micro plate 12 colliding into the immersion objective 11. The elastic member 33 absorbs vibration at the time of contact between the micro plate 12 and the immersion objective 11, and absorbs a change in point of contact in the central axial direction, which can reduce vibration of the measuring object.

The apex of the lens frame 32 can maintain a distance from the micro plate 12 to the apical lens 31 substantially constant by having contact therewith so as to serve as a spacer between the apical lens 31 and the micro plate 12, so that contact between the apical lens 31 and the micro plate 12 can be avoided.

Further, the micro plate 12 side is shifted in the horizontal direction in a state in which the lens frame apex 36 of the lens frame 32 and the micro plate 12 contact each other, which makes it possible to carry out measurement without the lens frame 32 and the micro plate 12 colliding. Moreover, a distance from the apical lens 31 to the micro plate 12 can be made substantially constant before and after a shift of the micro plate 12. As a consequence, it is possible to carry out measurement without performing focusing again at a new measurement place after a shift, and a series of measurements can be rapidly carried out.

Also when a sample having a sufficient width in the moving direction of the micro plate 12 and a sufficient depth in the axial direction of the apical lens 31 is provided as a measuring object, a distance WD from the apical lens 31 to a focal point (an operating distance) is constant, and a distance from the apical lens 31 to the micro plate 12 can be made constant. Accordingly, precise measurement can be carried out because a focal point remains in the sample even when the micro plate 12 shifts.

Moreover, when the lens frame apex 36 of the lens frame 32 is made close to have contact with the micro plate 12 (namely, at the time of shifting the immersion objective in step 504 in FIG. 5), the immersion objective 11 side is shifted in the direction of the micro plate 12 along the direction of the optical axis 28 (the central axis of the apical lens 31). This makes it possible to accurately and rapidly carry out a shift while contact.

It is possible to carry out a shift of the stage 13 at the time of measurement without having an influence on the immersion objective 11, the optical systems in front of and behind the immersion objective 11, such as, for example, the light source, the light path, the mirror, and the detector. Therefore, measurement can be accurately carried out. Because the stage 13 is restricted in a shift in the central axial direction of the apical lens 31, vibration of a measuring object can be reduced, which can maintain the stability of the measuring object.

SECOND EMBODIMENT

Next, a second embodiment of the present invention will be described.

In the second embodiment, a fluorescence analyzer to which the present invention is applied is the same as that in FIG. 1 described in the first embodiment, and thus, FIG. 1 is quoted therefor.

Figure 8:
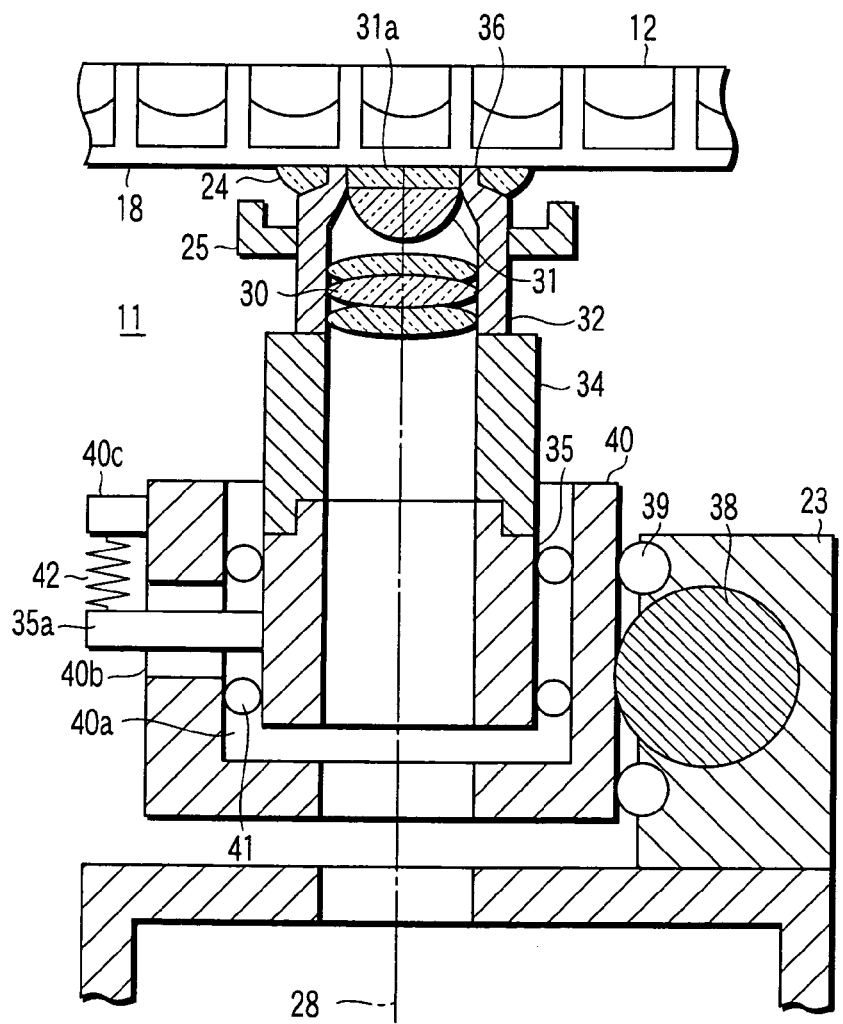
FIG. 8 is a diagram showing a schematic configuration of an objective shifting device for use in a second embodiment of the present invention.

FIG. 8 is a view showing another example of the objective shifting device 23, and the same components as those in FIG. 2 are denoted by the same reference numerals.

In FIG. 8, the lens frame 32 of the immersion objective 11 is fixed to the outer cylinder 34. A driving platform 40 is provided to the objective shifting device 23. The driving platform 40 has a hollow portion 40a along the optical axis 28. The objective mounting platform 35 is provided to the hollow portion 40a so as to be movable along the optical axis 28. Further, guides 41 which maintain the objective mounting platform 35 in the horizontal direction in the driving platform 40 are provided in the driving platform 40. In this way, in the second embodiment as well, the objective mounting platform 35 having the immersion objective 11 mounted thereon is restricted in a shift in a plane perpendicular to the optical axis 28, and only a shift in the direction of optical axis 28 (the central axis of the apical lens 31) direction is permitted.

A hole 40b is formed at the side face of the driving platform 40. An operating arm 35a is provided at the side face of the objective mounting platform 35. The operating arm 35a projects outward through the hole 40b at the side face of the driving platform 40. Then, an elastic member 42 is provided between the apical portion of the operating arm 35a and the projecting portion 40c at the side face of the driving platform 40.

The elastic member 42 exerts a bias force on the driving platform 40 such that the objective mounting platform 35 turns to the direction of the micro plate 12 (upward on the paper) so as to be parallel to the optical axis 28 (in the central axial direction of the apical lens 31). Also, the elastic member 42 has a role of absorbing the vibration generated at the time of contact between the lens frame apex 36 of the lens frame 32 and the bottom face 18 of the micro plate 12, and a role of absorbing vibration while maintaining the contact therebetween. As the elastic member 42 as well, for example, a metal spring, an air spring, or the like is used in the same manner as in the first embodiment. Additionally, in place of the elastic member 42, a substance having a restoring force or a repulsive force of a magnet may be utilized.

The objective shifting device 23 has the feeding mechanism 38 for shifting the driving platform 40 in the optical axis 28 direction, and the guides 39 for maintaining the position of the driving platform 40 in the horizontal direction. Accordingly, the objective mounting platform 35 having the immersion objective 11 mounted thereon is restricted in a shift in a plane perpendicular to the optical axis 28, and only a shift only in the direction of the optical axis 28 (the central axis of the apical lens 31) is permitted.

The other parts are the same as those in FIG. 2.

In accordance with a configuration as described above, it is set such that the lens frame apex 36 is pressed against the bottom face 18 of the micro plate 12 by a bias force of the elastic member 42 by shifting the driving platform 40 in the direction of the micro plate 12 (upward on the paper) by the feeding mechanism 38 at the time of driving the fluorescence analyzer main body 10. As a result, the lens frame apex 36 is made to be always in contact with the bottom face 18 of the micro plate 12, and hereinafter, driving according to the same procedures as those described in the first embodiment is executed.

Accordingly, even when an elastic member is not built in the immersion objective 11, the objective mounting platform 35 having the immersion objective 11 mounted thereon is installed into the driving platform 40, whereby a tensile force by which the objective mounting platform 35 turns to the micro plate 12 (upward on the paper) so as to be parallel to the optical axis 28 can be exerted on the driving platform 40 by the elastic member 42. Consequently, the lens frame apex 36 can be made to be always in contact with the bottom face 18 of the micro plate 12 by shifting the immersion objective 11 along with the driving platform 40 to the micro plate 12 side by the objective shifting device 23. Therefore, the same operational effects as those in the first embodiment described above can be obtained.

Note that, in the first and second embodiments, a resin having a self-lubricating property is used as a material of the lens frame apex 36. However, it may be formed by using the same material as that of the lens frame 32, and the lens frame apex 36 may be coated with a fluorine-based resin. Further, a rolling member may be provided to the lens frame 32, and the lens frame 32 may be slid to roll while having contact with the micro plate 12 with a bearing or the like. Lubricating processing may be carried out on the bottom face 18 of the micro plate 12. In the first and second embodiments, the immersion objective 11 is used as an objective, and an objective used in a dry state may be used. Furthermore, in the first and second embodiments, a case of using a microscope has been described. However, in a case of observation using a micro plate reader as well, the same operational effects can be obtained. Moreover, in the first and second embodiments, the micro plate 12 is used. However, the present invention can be applied to a case of observation using, in place of the micro plate 12a, a glass slide as a container which houses a measuring object. In this case, when the glass slide is shifted by bringing the lens frame apex 36 into contact with the lower surface of the glass slide, focusing can be maintained on a sample on the glass slide even if there is a strain on the lower surface of the glass slide, and therefore, the same operational effects can be obtained. Further, when a microscope with upright frame is used in place of an inverted microscope, focusing is maintained on a sample by bringing the lens frame apex 36 into contact with a cover glass, and the same operational effects can be obtained.

In addition, the present invention is not limited to the above-described embodiments, and at the stage of implementing the invention, various modifications are possible within a range which does not change the gist of the present invention.

Moreover, in the above-described embodiments, inventions at different stages are included, and various inventions can be considered to be the present invention due to appropriate combinations of a plurality of the disclosed structural requirements.

An objective, a microscope, and an optical analyzer, and a method of driving an optical analyzer which can prevent a measuring object, a plate which supports the measuring object, a container which houses the measuring object, or the like from being damaged are provided.

What is claimed is:

1. An objective having an apical lens and a lens frame which supports the apical lens, comprising
    an elastic member which supports the lens frame by exerting a bias force in a central axial direction of the apical lens, wherein
    an apex of the lens frame has a convex portion which projects outward in the central axial direction more than an apical surface of the apical lens.

2. The objective according to claim 1, wherein the apex of the lens frame has:
    a portion having a maximum distance so as to be farthest away in the central axial direction from the apical surface of the apical lens, and
    a portion to which a distance from a position for supporting the apical lens is greater than or equal to zero, and is less than the maximum distance.

3. The objective according to claim 1, wherein the apex of the lens frame has a resin member with self-lubricating property.

4. The objective according to claim 1, wherein the apex of the lens frame is coated with a fluorocarbon resin.

5. A method of driving an optical analyzer which measures light incident into an objective from a measuring object, and which determines various characteristics of the measuring object on the basis of information obtained by measurement, the method comprising:
    bringing one of a measuring object, a plate which supports the measuring object, and a container which houses the measuring object into contact with an apex of the lens frame; and
    shifting one of the measuring object, the plate and the container, and the objective relatively in a plane perpendicular to a central axis of the objective while maintaining the contact between one of the measuring object, the plate and the container, and the apex of the lens frame, wherein
    the objective has an apical lens and a lens frame which supports the apical lens, and
    an apex of the lens frame has a convex portion which projects outward in a central axial direction of the apical lens more than an apical surface of the apical lens.

6. The method of driving an optical analyzer according to claim 5, wherein
the bringing into contact includes shifting the objective in a central axial direction of the objective, and
the shifting includes shifting one of the measuring object, the plate and the container in a plane perpendicular to the central axis.

7. The method of driving an optical analyzer according to claim 5, further comprising
determining a focal position at a position further away than a maximum displacement from a boundary of the measuring object in the central axial direction within a range in which the measuring object exists, on the basis of the maximum displacement in the central axial direction on a contact surface between one of the measuring object, the plate and the container, and the apex of the lens frame.

8. An optical analyzer which measures light incident into an objective from a measuring object, and which determines various characteristics of the measuring object on the basis of information obtained by measurement, comprising:
contact means for bringing one of a measuring object, a plate which supports the measuring object, and a container which houses the measuring object into contact with an apex of the lens frame; and
shifting means for shifting one of the measuring object, the plate and the container, and the objective relatively in a plane perpendicular to a central axis of the objective while maintaining the contact between one of the measuring object, the plate and the container, and the apex of the lens frame, wherein
the objective has an apical lens and a lens frame which supports the apical lens, and
an apex of the lens frame has a convex portion which projects outward in a central axial direction of the apical lens more than an apical surface of the apical lens.

9. The optical analyzer according to claim 8, wherein the objective has an elastic member which supports the lens frame by exerting a bias force in the central axial direction of the apical lens.

10. The optical analyzer according to claim 8, wherein the contact means includes an objective shifting device which shifts the objective in the central axial direction.

11. The optical analyzer according to claim 10, wherein the objective shifting device has an elastic member which supports the objective by exerting a bias force in the central axial direction.

12. The optical analyzer according to claim 10, wherein the shifting means has a stage which supports one of the measuring object, the plate and the container, and
a shift of the stage in the central axial direction is restricted.

13. The optical analyzer according to claim 8, wherein the shifting means includes a stage which supports one of the measuring object, the plate and the container, and shifts in a plane perpendicular to the central axial direction.

14. The optical analyzer according to claim 13, wherein a shift of the objective in a plane perpendicular to the central axial direction is restricted.

15. An optical analyzer which measures light incident on an objective from a measuring object, and which determines various characteristics of the measuring object on the basis of information obtained by measurement, the optical analyzer comprising:
an objective shifting device which brings one of a measuring object, a plate which supports the measuring object, and a container which houses the measuring object into contact with an apex of the lens frame by shifting the objective in a central axial direction; and
a stage which supports one of the measuring object, the plate and the container, and which is restricted in shift in the central axial direction, and is shifted in a plane perpendicular to the central axial direction, wherein
the objective has an apical lens, a lens frame which supports the apical lens, and an elastic member which supports the lens frame by exerting a bias force in the central axial direction of the apical lens, and
an apex of the lens frame has a convex portion which projects outward in the central axial direction more than an apical surface of the apical lens.

16. An optical analyzer which measures light incident on an objective from a measuring object, and which determines various characteristics of the measuring object on the basis of information obtained by measurement, the optical analyzer comprising:
an objective shifting device which shifts the objective in a central axial direction, thereby bringing one of a measuring object, a plate which supports the measuring object, and a container which houses the measuring object into contact with an apex of the lens frame; and
a stage which supports the measuring object, the plate or the container, and which is restricted in shift in the central axial direction, and is shifted in a plane perpendicular to the central axial direction, wherein
the objective has an apical lens and a lens frame which supports the apical lens,
an apex of the lens frame has a convex portion which projects outward in the central axial direction more than an apical surface of the apical lens, and
the objective shifting device includes an elastic member which supports the objective by exerting a bias force in the central axial direction.

17. A microscope comprising:
an objective;
a stage which supports an observing object, a plate which supports the observing object, or a container which houses the observing object; and
an adjusting device which adjusts a distance between the objective and the stage, wherein
the objective has an apical lens and a lens frame which supports the apical lens,
an apex of the lens frame has a convex portion which projects outward in a central axial direction more than an apical surface of the apical lens, and
the adjusting device brings one of the observing object, the plate and the container into contact with the apex of the lens frame.

* * * * *